United States Patent
Edwards

(10) Patent No.: US 11,305,861 B2
(45) Date of Patent: Apr. 19, 2022

(54) WING ASSEMBLY MOUNT

(71) Applicant: AIRBUS OPERATIONS LIMITED, Bristol (GB)

(72) Inventor: Henry Edwards, Bristol (GB)

(73) Assignee: Airbus Operations Limited, Bristol (GB)

(*) Notice: Subject to any disclaimer, the term of this patent is extended or adjusted under 35 U.S.C. 154(b) by 384 days.

(21) Appl. No.: 16/507,322

(22) Filed: Jul. 10, 2019

(65) Prior Publication Data

US 2020/0017188 A1 Jan. 16, 2020

(30) Foreign Application Priority Data

Jul. 12, 2018 (GB) ................................ 1811409

(51) Int. Cl.
*B64C 1/26* (2006.01)

(52) U.S. Cl.
CPC ...................... *B64C 1/26* (2013.01)

(58) Field of Classification Search
CPC .................. B64C 1/26; B64D 24/26
See application file for complete search history.

(56) References Cited

U.S. PATENT DOCUMENTS

| 4,013,246 A | * | 3/1977 | Nightingale | B64D 27/18 |
| | | | | 244/54 |
| 8,800,916 B2 | * | 8/2014 | Marche | B64D 27/26 |
| | | | | 244/54 |
| 9,328,630 B2 | * | 5/2016 | Brochard | B64D 27/20 |
| 9,868,543 B2 | * | 1/2018 | Pautis | B64D 29/02 |
| 10,046,850 B2 | * | 8/2018 | Gamble | B64C 1/28 |
| 2008/0149758 A1 | | 6/2008 | Colgren et al. | |
| 2013/0264428 A1 | * | 10/2013 | Rouyre | B64C 37/00 |
| | | | | 244/45 R |
| 2018/0057136 A1 | | 3/2018 | Haley et al. | |

FOREIGN PATENT DOCUMENTS

| EP | 2 716 543 | 4/2014 |
| GB | 1 348 826 | 3/1974 |
| GB | 2547957 | 9/2017 |
| GB | 2551311 | 12/2017 |

OTHER PUBLICATIONS

Combined Search and Examination Report for GB1811409.0 dated Dec. 21, 2018, 7 pages.

* cited by examiner

*Primary Examiner* — Richard R. Green
*Assistant Examiner* — Madison Elizabeth Dittner
(74) *Attorney, Agent, or Firm* — Nixon & Vanderhye P.C.

(57) ABSTRACT

A wing assembly mount for mounting a wing to a fuselage of an aircraft. The wing assembly mount includes a spigot arrangement between a wing assembly and a fuselage assembly. The spigot arrangement is able to react a load between the wing assembly and the fuselage assembly.

14 Claims, 3 Drawing Sheets

WING ASSEMBLY MOUNT

RELATED APPLICATION

This application claims priority United Kingdom Patent Application GB 1811409.0, filed Jul. 12, 2018, the entirety of which is incorporated by reference.

FIELD OF THE INVENTION

The present invention relates to a wing assembly mount. In particular, the present invention relates to a wing assembly mount for mounting the wing assembly to a fuselage assembly of an aircraft. The present invention also relates to an aircraft assembly and a method of assembling a wing assembly with a fuselage assembly of an aircraft.

BACKGROUND OF THE INVENTION

Different methods are known for joining the wing and fuselage of an aircraft. Typically, the wing will comprise a centre wing box and two outer wing sections extending from the centre wing box. The centre wing box is connected to the fuselage by a wing box to fuselage joint, and the outer wing sections are each joined to the centre wing box by an outer wing section to wing box joint. These joints are typically rigid joints and use a combination of buttstraps, crown fittings and threaded fastener joints to join these assemblies together. Such an assembly process is complicated and time consuming. With this assembly process, the centre wing box to fuselage joint is assembled first, with the outer wing section to wing box joints being subsequently connected to the centre wing box-fuselage assembly.

In another assembly process it is known to provide a fully assembled wing, also known as a tip-to-tip wing, which is assembled prior to connecting with the fuselage. By providing a tip-to-tip wing assembly, it is possible to remove the need to have a captive centre wing box and allows the wing assembly to be assembled separately to the fuselage. However, such an approach leads to a less weight efficient construction and has a complicated assembly.

It is necessary to constrain the forces acting in all directions at the wing to fuselage joint in order to prevent the wing and fuselage moving relative to each other. As such, rigid joints such as direct lug connections may be used to join the tip-to-tip wing to the fuselage.

SUMMARY OF THE INVENTION

According to an aspect of the invention, there is provided a wing assembly mount for mounting the wing assembly to a fuselage assembly of an aircraft, the mount comprising a spigot arrangement configured to react a load between the wing assembly and the fuselage assembly.

With such an arrangement it is possible to simplify assembly of the fuselage and wing assembly. Alignment of fixings between the assemblies may be simplified.

The spigot arrangement may comprises a spigot configured to extend in a z-direction of the aircraft.

With such an arrangement, the alignment of the wing and fuselage assemblies is simplified during assembly. The spigot arrangement provides a discrete attachment point, which simplifies alignment of the remainder of the joint. The reaction of loads through the mount may be simplified, and reduce undesired loads from being transferred through the mount. Drag loads and side loads may be carried by the spigot arrangement.

An "x-direction" of an aircraft relates to a roll axis direction. That is, in a longitudinal axis direction of a fuselage of the aircraft. A "y-direction" of an aircraft relates to a pitch axis direction. That is, in a wingspan direction of a wing. The "z-direction" of an aircraft relates to a yaw axis direction. The yaw axis direction is substantially perpendicular to the x-direction along the longitudinal axis of a fuselage of the aircraft and substantially perpendicular to the y-direction along the wingspan direction of a wing.

The spigot arrangement may be configured to react loads acting in an x-direction and a y-direction of the aircraft.

The mount may comprise a spigot-receiving bush. The bush may be a plain bearing. The spigot may be configured to be on one of the wing assembly and the fuselage assembly. The spigot-receiving bush may be configured to be on the other of the wing assembly and the fuselage assembly.

The spigot arrangement may be limited to one spigot configured to extend in a z-direction of the aircraft.

With such an arrangement, unnecessary bending loads may be restricted from being transferred through the spigot arrangement.

The mount may comprise a side load connection configured to react loads about an axis of the spigot.

With such an arrangement, the transfer of loads may be simplified.

The side load connection and the spigot arrangement may be spaced in the y-direction of the aircraft, and may be disposed on opposing sides of the centreline of the wing assembly.

The side load connection may be a shackle connection.

The spigot arrangement may be offset from a centreline of the wing assembly.

Such a configuration helps to minimise fuselage crushing due to wing bend about the x-direction. Wear of the spigot arrangement may be minimised.

The wing assembly may be a horizontally-extending wing assembly. The wing assembly may be a low-wing assembly.

The wing assembly may be a tip-to-tip wing assembly.

The mount may further comprise a connector arrangement configured to connect between the wing assembly and the fuselage assembly.

The connector arrangement may be configured to carry a load in a z-direction of the aircraft. As such, the load in the z-direction may be carried by the mount in a straightforward manner.

The connector arrangement may be configured to permit rotation about an axis extending in an x-direction of the aircraft. As such, the transfer of wing bending loads to the fuselage assembly may be minimised.

The connector arrangement may comprise a plurality of shackle connections.

Two of the shackle connections may be disposed on one side of a centreline of the wing assembly. The spigot arrangement may be disposed between the two of the shackle connections.

By locating the spigot arrangement between two of the shackle connections it is possible to minimise relative displacement of the shackle and shackle bush in the z-direction. Such movement may result from wing-bending.

The connector arrangement may be configured to provide a hanging connection to carry the load of the wing assembly in the z-direction on the fuselage assembly.

The spigot arrangement may be configured to connect to a frame of the fuselage assembly.

At least two shackle connections may be configured to mount to a forward spar of the wing assembly, and at least two further shackle connections may be configured to mount to a rearward spar of the wing assembly.

According to a further aspect of the invention, there is provided a wing assembly mount for mounting the wing assembly to a fuselage assembly of an aircraft, comprising a spigot arrangement, and a shackle arrangement.

According to a further aspect of the invention, there is provided an aircraft assembly comprising a wing assembly, a fuselage assembly and a wing assembly mount as described above.

The aircraft assembly may be an off-wing mounted engine configuration, such as a rear mounted engine configuration.

According to a further aspect of the invention, there is provided a method of assembling a wing assembly with a fuselage assembly of an aircraft, the method comprising: locating the wing assembly relative to the fuselage assembly with a spigot; connecting a connector arrangement between the wing assembly and the fuselage assembly to support the wing assembly on the fuselage assembly.

BRIEF DESCRIPTION OF THE DRAWINGS

Embodiments of the invention will now be described with reference to the accompanying drawings, in which.

DETAILED DESCRIPTION OF
EMBODIMENT(S)

Figure 1:
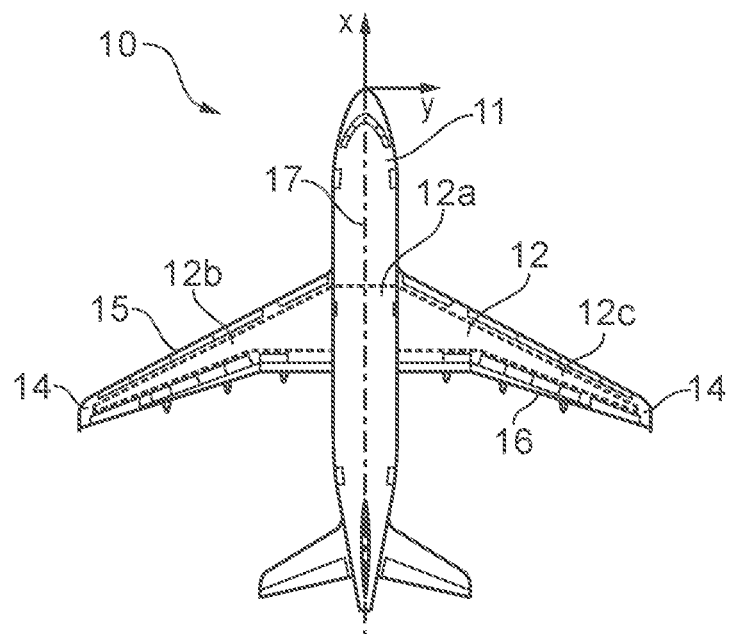
FIG. 1 is a plan view of an aircraft.

An aircraft 10 is shown in FIG. 1. The aircraft 10 includes a fuselage 11. A wing 12 extends from the fuselage 11. The wing comprises a central wing box 12a and outer wing sections 12b, 12c extending from either side of the fuselage 11. It will be appreciated that the fuselage 11 and wings 12 may take a variety of different planform shapes and profiles depending on the particular application. The wing 12 has wing tips 14 at distal ends to the fuselage 11. The wing 12 has a leading edge 15 and a trailing edge 16.

In the following description, the term "front" refers to components towards the leading edge of the wing, and the term "rear" refers to components towards the trailing edge of the wing. The terms "forward" and "rearward" shall be construed accordingly. The position of features may be construed relative to other components, for example a forward component may be disposed on a forward side of another component, but towards the rear of the wing. The trailing edge relates to a rearmost section aft of the rear spar.

Figure 4:
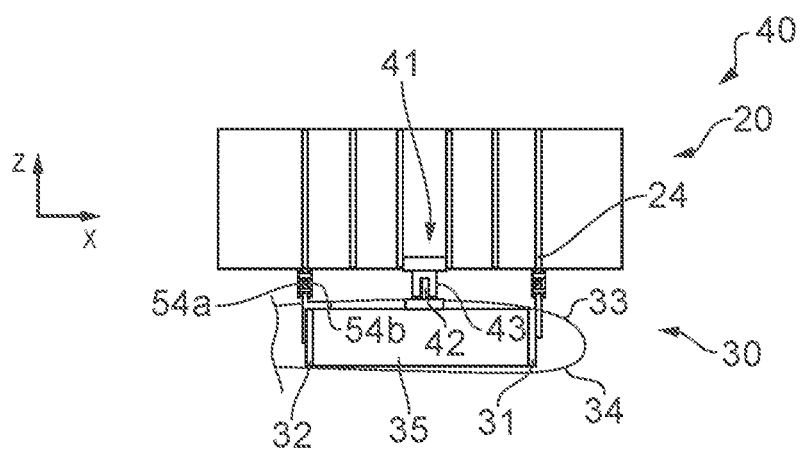
FIG. 4 is a schematic side view of the wing assembly mount of FIG. 2.
Figure 5:
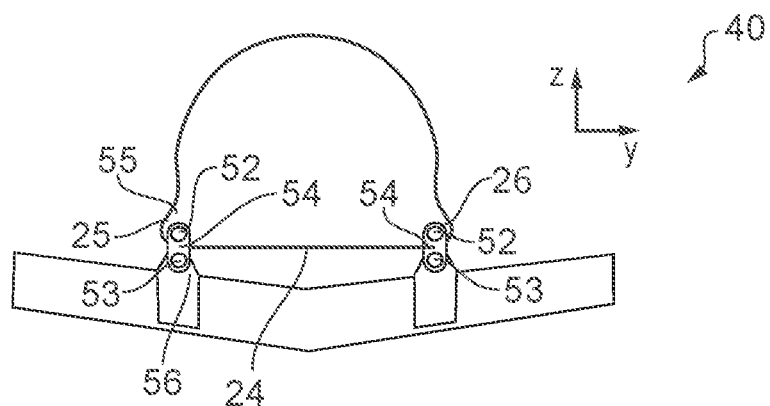
FIG. 5 is a schematic front view of the wing assembly mount of FIG. 2.

The fuselage 11 has a longitudinal axis 17. The longitudinal axis 17 defines an "x-direction" as shown in FIG. 1. The "x-direction" of the aircraft 10 relates to a roll axis direction. A spanwise direction of the aircraft 10 is defined between the wing tips 14. The spanwise direction defines a "y-direction" as shown in FIG. 1. The spanwise direction relates to a pitch axis direction. A "z-direction" of the aircraft 10 extends perpendicular to the "x-direction" and "y-direction" as shown in FIGS. 4 and 5. The "z-direction" relates to a yaw axis direction. The aerodynamic lift force which acts through the centre of pressure acts substantially in the z-direction.

The wing 12 is a tip-to-tip wing. That is, the centre wing box 12a, and left and the right wing outer wing sections 12b, 12c are assembled together, prior to assembly with the fuselage 11. The centre wing box may be omitted. In FIG. 1, the aircraft 10 is an off-wing engine mounted configuration, however it will be understood that the aircraft may have an alternative configuration, for example, a forward mounted or aft mounted engine configuration. The aircraft may have an on-wing mounted engine configuration.

Referring now to FIGS. 2 to 5, a wing assembly mount 40 will be described. The wing assembly mount 40 is configured to mount the wing 12 to the fuselage 11. Although the embodiments described herein will be described by reference to mounting the wing 12 to the fuselage 11, it will be understood that such a mount does not necessarily relate to mounting a fully assembled wing and fuselage, and may be configured to mount a wing assembly, for example a partially assembled wing, with a fuselage assembly, for example a partially assembled fuselage. The wing assembly may be the wing box. The fuselage assembly may be a section of the fuselage 11.

Figure 2:
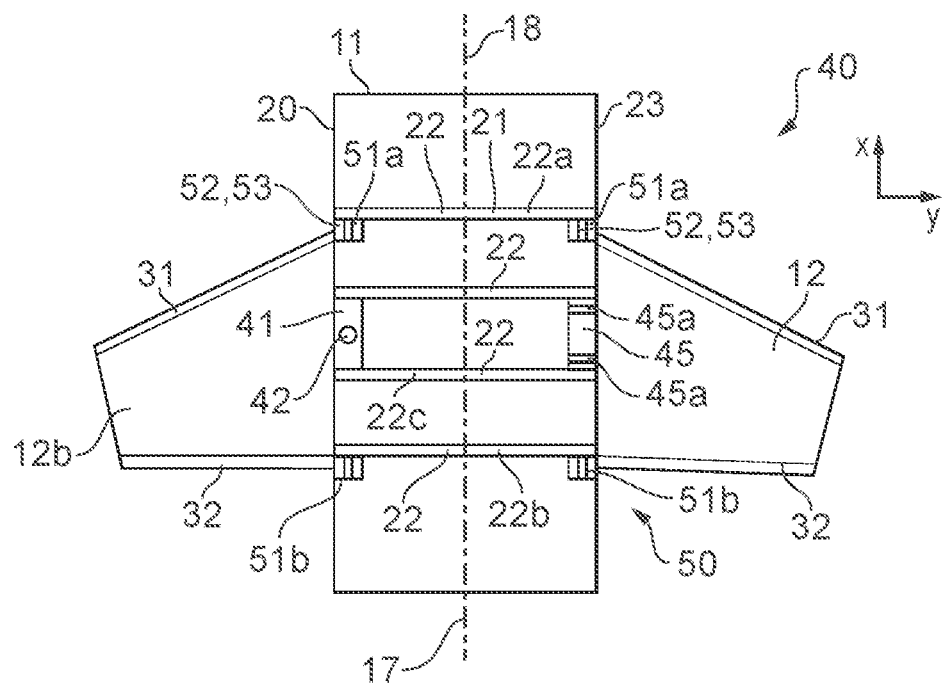
FIG. 2 is a schematic plan view of a wing assembly mount mounting part of a fuselage assembly and part of a wing assembly.
Figure 3:
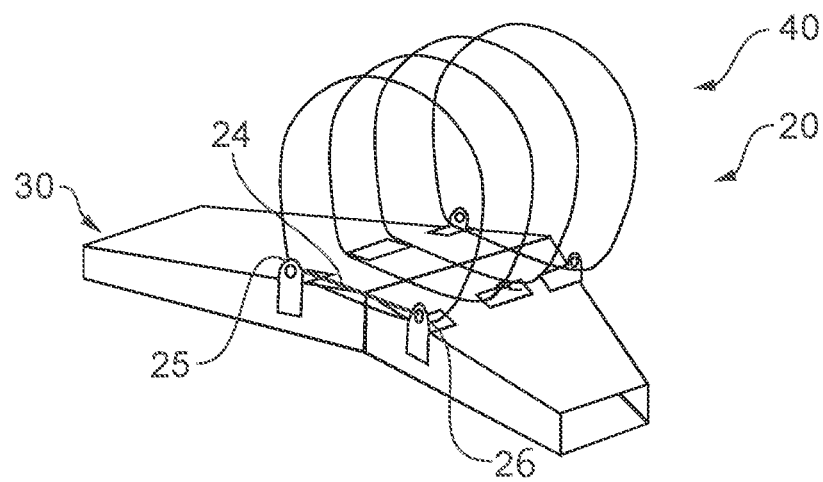
FIG. 3 is a schematic perspective view from rearward of the wing assembly mount of FIG. 2.

A fuselage assembly 20 is shown in FIGS. 2 to 4. The fuselage assembly shown comprises part of the fuselage 12. Features of the fuselage assembly 20 are omitted for clarity. The fuselage assembly 20 comprises a structural assembly 21. The structural assembly 21 comprises frames 22 and stringers, not shown, which are also known as longerons. The frames 22 are spaced apart from each other in a longitudinal direction of the fuselage 11. The frames 22 extend in a hoopwise arrangement. As such, the frames 22 are generally arcuate. The frames 22 are parallel and spaced from each other. Each frame 22 has a lower end 24. The lower end 24 defines opposing lower edges 25, 26 of the frame 22 on either side of the longitudinal axis 17 of the fuselage 11. The lower end 24 of the frame 22 extends between the lower edges 25, 26. Each frame 22 defines a structural component. The fuselage stringers, not shown, extend in a longitudinal direction along the fuselage 11. The fuselage stringers define structural components. The fuselage stringers are spaced apart in a hoopwise direction. The frames 22 and fuselage stringers are mounted to a fuselage skin 23. The frames 22 and fuselage stringers are disposed on the inner side of the fuselage skin 23.

A forward frame 22a and a rearward frame 22b, that is two frames which are spaced relative to each other in the longitudinal direction, are configured to provide mounting points for the wing assembly mount 40 as will be described below. The spacing of the forward frame 22a and the rearward frame 22b corresponds generally to the spacing of structural members of the wing assembly 30 as will become apparent. Further frames 22c are disposed between the forward frame 22a and the rearward frame 22b. Frames 22 are also disposed forward of the forward frame 22a and rearward of the rearward frame 22b, although it will be appreciated that the configuration of the frames may vary.

Referring in particular to FIG. 4, the wing assembly 30 is shown. The wing assembly 30 comprises a forward spar 31 and a rearward spar 32. An upper skin 33 and a lower skin 34 extend over the wing structure. The upper skin 33 bounds an upper side of the wing assembly 30 and the lower skin 34 bounds a lower side of the wing assembly 30. Ribs 35 extend between the forward spar 31 and the rearward spar 32. The ribs 35 extend in a chordwise direction, which is generally in the x-direction. Wing stringers, not shown, extend in the wing in a spanwise direction, that is generally in the y-direction. The ribs 35 and stringers, not shown, form a wing structural assembly.

When the fuselage assembly 20 and the wing assembly 30 are assembled together with the wing assembly mount 40, the upper side of the wing assembly 30 is brought together with the lower side of the fuselage assembly 20.

The wing assembly mount 40 comprises a spigot arrangement 41. The spigot arrangement 41 comprises a spigot 42 and a spigot bush 43. The spigot arrangement 41 is a nested pin arrangement. The spigot arrangement is capable of reacting loads in two directions, but remains free in a third direction. The spigot bush 43 is a sleeve in which the spigot 42 is receivable. The spigot 42 is slideable in the spigot bush 43 in the direction along its longitudinal axis. In the present configuration, the spigot 42 is configured to be on the wing assembly 30, and the spigot bush 43 is configured to be on the fuselage assembly 20. However, it will be understood that in an alternative embodiment the spigot 42 is configured to be on the fuselage assembly 20 with the spigot brush 43 configured to be on the wing assembly 30.

The spigot 42 of the spigot arrangement 41 extends in the z-direction. The spigot 42 extends upwardly from the wing assembly 30. The spigot arrangement 41 is configured to react loads in the x and y-directions when the wing assembly mount 40 mounts the fuselage assembly 20 and the wing assembly 30. The spigot arrangement 41 does not transfer loads in the z-direction.

The spigot arrangement 41 is offset from a centreline 18 of the wing assembly 30. A spigot arrangement 41 is offset in the y direction from the longitudinal axis of the fuselage assembly 20. The spigot arrangement 41 is between the forward spar 31 and the rearward spar 32.

The wing assembly mount 40 comprises a connector arrangement 50. The connector arrangement 50 connects the wing assembly 30 and the fuselage assembly 20. The connector arrangement 50 comprises a plurality of shackle connections 51a, 51b. In the present arrangement the connector arrangement 50 comprises four shackle connections 51a, 51b. Two forwards shackle connections 51a are disposed on either side of the centre line of the wing assembly 30. Two rearward shackle connections 51b are disposed on either side of the centre line of the wing assembly 30. It will be understood that the number of shackle connections 51a, 51b may vary. The shackle connections 51a, 51b extend between the fuselage assembly 20 and the wing assembly 30. The shackle connections 51 are configured to carry a load in the z-direction. The wing assembly mount 40 comprises a side load connection 45. The side load connection 45 is offset from the centreline 18 of the wing assembly 30. The side load connection 45 is disposed on an opposing side of the centreline 18 of the wing assembly 30 to the spigot arrangement 41. The side load connection 45 is configured to react a load acting in the x-direction. The side load connection 45 is also configured to react a moment about the spigot arrangement 41.

The arrangement of the components of the wing assembly mount 40 will now be described. As described above, the wing assembly mount 40 comprises the spigot arrangement 41, the connector arrangement 50 including shackle connections 51a, 51b, and the side load connection 45.

The spigot arrangement 41 is configured to carry loads in two directions, that is in the x-direction and the y direction, but remains free in the third direction, that is the z-direction. The side load connection 45 is configured to react loads in the x-direction. The shackle connections 51a, 51b are spaced apart from each other. The shackle connections 51a, 51b are configured to carry loads in the z-direction, that is loads acting perpendicular to the loads reacted by the spigot arrangement 41.

Each shackle connection 51a, 51b comprises two parallel spaced hinge axes. Each shackle connection 51a, 51b comprises two lug joints 55, 56 which are spaced apart in the z-direction by a connector 54. Each lug joint 55, 56 provides a single hinge axis. An example of a shackle connection 51a, 51b is readily apparent in FIG. 5. The shackle connection 51a, 51b comprises two hinge pins 52, 53 which are spaced apart by connector 54. Each hinge pin 52, 53 forms the lug joint 55, 56 with a lug. The hinge pins 52, 53 define hinge axes extending parallel to but spaced from each other. One of the lug joints 55 is a fuselage lug joint for mounting to the fuselage assembly 20 and the other lug joint 56 is a wing assembly lug joint for mounting to the wing assembly 30. Each connector 54 comprises two connector members 54a, 54b.

The side load connection 45 also comprises a shackle arrangement similar to that described above. However, the shackle arrangement of the side load connection 45 is configured to act horizontally whereas the shackle arrangement of each shackle connections 51a, 51b is configured to act vertically. The hinge axes of each shackle connection 51a, 51b extends in the x-direction. The hinge axes 45a of the side load connection 45 extend in the y-direction.

The forward shackle connections 51a mount to the forward spar 31. The wing assembly lug joint 56 rigidly mounts to the forward spar 31 for each forward shackle connection 51a. The forward shackle connections 51a mount to the forward frame 22a. The fuselage lug joint 55 of each forward shackle connection is rigidly mounted to the forward frame 22a. The forward shackle connections 51a mount to the lower edges 25, 26 of the forward frame 22a. As such, one of the forward shackle connections 51a mounts to one side of the centreline of the wing assembly 30 and another one of the forward shackle connections 51a mounts to the other side of the centreline 18 of the wing assembly 30. The rearward shackle connections 51b mount between the rearward spar 32 and the rearward frame 22b.

One of the rearward shackle connections 51b is disposed to one side of the centreline 18 of the wing assembly 30 and another one of the rearward shackle connections 51b is disposed to the other side of the centreline 18 of the wing assembly 30. The spigot arrangement 41 is disposed on one side of the centreline 18 of the wing assembly 30. A first axis is defined extending generally in the x-direction between one of the forward shackle connections 51a and one of the rearward shackle connections 51b on one side of the centreline 18 of the wing assembly 30. The spigot arrangement 41 is disposed along the first axis between said forward and rearward shackle connections 51a, 51b. On an opposing side of the wing assembly 30 forward and rearward shackle connections 51a, 51b are spaced apart generally in the x-direction and define a second axis therebetween. The side load connection 45 is disposed along said second axis.

The spigot arrangement 41 mounts to one or more of the further frames 22c between the forward frame 22a and the rearward frame 22b. The spigot arrangement 41 mounts to one of the structural components, for example one or more ribs 35, wing stringers, not shown, or an intermediate spar, not shown, between the forward and rearward spars 31 and 32 of the wing assembly 30. The side load connection 45 is similarly mounted.

Figure 7:
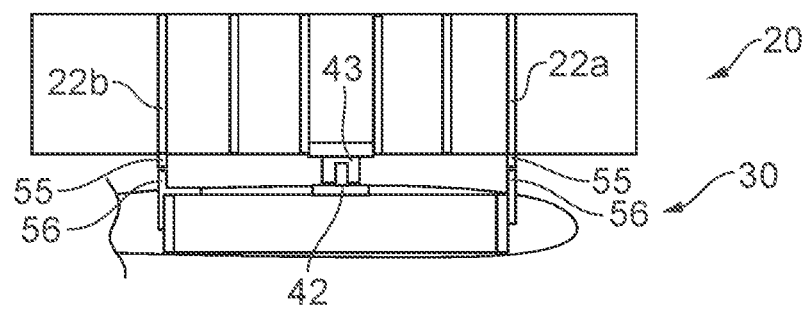
FIG. 7 is a schematic side view of the wing assembly mount of FIG. 2 in a partially assembled condition.
Figure 8:
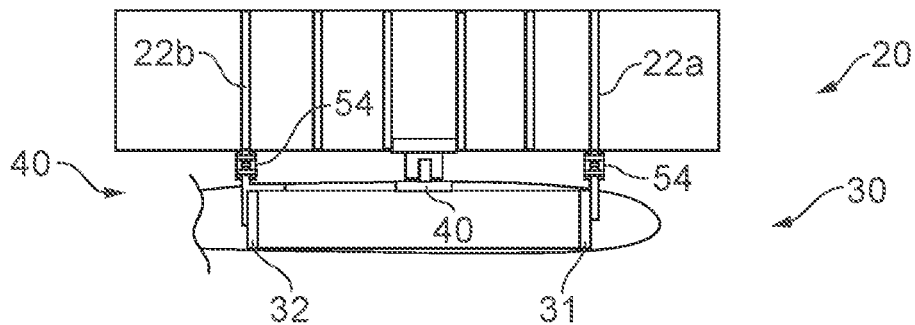
FIG. 8 is a schematic side view of the wing assembly mount of FIG. 2 in an assembled condition.

Assembly of the fuselage assembly 20 and the wing assembly 30 will now be described with reference, in particular, to FIGS. 6 to 8.

Figure 6:
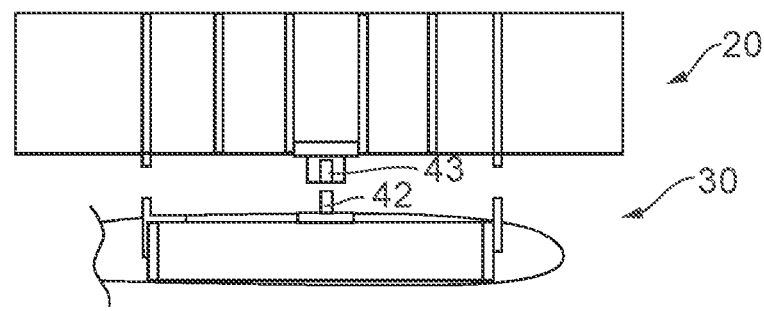
FIG. 6 is a schematic side view of the wing assembly mount of FIG. 2 in a disassembled condition.

To mount the fuselage assembly 20 and wing assembly 30 with the wing assembly mount 40, the fuselage assembly 20 and wing assembly 30 are brought into general alignment with each other as shown in FIG. 6. The opposing parts of the spigot arrangement 41 are aligned. That is, the spigot 42 is brought into alignment with the spigot bush 43. The wing assembly 30 is positioned below the fuselage assembly 20. When the spigot 42 and spigot bush 43 are aligned, the fuselage assembly 20 and wing assembly 30 are brought together by moving one of these two assemblies in the z-direction to bring the assemblies into abutment. The spigot 42 is received in the spigot bush 43 to aid alignment of the two assemblies, as shown in FIG. 7. As such, during mounting of the wing assembly 30 and fuselage assembly 20 the two assemblies may be straightforwardly aligned through use of the spigot arrangement 41. With the parts of the spigot arrangement 41 in abutment with each other, the fuselage assembly 20 and wing assembly 30 may be moved into the correct alignment and may be pivoted about the spigot 42. The fuselage assembly 20 and wing assembly 30 are prevented from moving with respect to each other in the x and y-directions.

Once the spigot 42 is engaged with the spigot bush 43, the remaining connections may be easily aligned. The joints 55, 56 of the shackle connections 51a, 51b may be aligned with each other, and the joints of the side load connection 45 may be aligned with each other. The use of the shackle arrangements provides for straightforward alignment of these connections. Once the joints are aligned as shown in FIG. 7, the shackle connections 51a, 51b and the side load connection 45 may be mounted. The forward shackle connections 51a, the rearward shackle connections 51b and the side load connection 45 are connected through use of the connectors 54. Once the shackle connections 51 have been connected between the fuselage assembly 20 and the wing assembly 30 the relative movement of the fuselage assembly 20 and the wing assembly 30 in the z-direction is restrained. The loading is carried between the forward and rearward spars 31, 32 and the forward and rearward frames 22a, 22b.

It will be understood that wing bending occurs in the wing 12 about an axis in the x-direction. By providing the spigot arrangement 41 in alignment with one of each of the forward shackle connection 51a and rearward shackle connection 51b then relative movement at the spigot arrangement 41 is minimised, whilst movement at the centreline is possible.

The use of shackle connections 51a, 51b between the fuselage assembly 20 and the wing assembly 30 helps to restrict wing bending loads being transferred into the frames 22 of the fuselage, and therefore causing fuselage crushing. By providing the shackle connections 51a, 51b with the hinge axes extending in the x-direction, pivoting at the shackle connections 51a, 51b is provided in the x-direction. Through the use of the spigot arrangement 41 and the side load connection 45, it is possible for the shackle connections 51a, 51b to be provided to account for wing bending without the need for the shackle connections 51a, 51b to carry loads in the x and y-directions. The spigot arrangement 41 and side load connection 45 are configured to carry loads in the x-direction between the fuselage assembly 20 and wing assembly 30.

It will be appreciated that the above described configuration provides for a simplified assembly method of mounting the wing assembly 30 and the fuselage assembly 20. Furthermore, the complexity of the wing assembly mount 30 may be minimised. By providing the shackle connections 51a, 51b at the lower end 24 of the frames 22 of the fuselage assembly 20 then the wing assembly mount 40 may be easily mounted to the structural assembly 21 of the fuselage assembly 20. By providing the shackle connections 51 at the forward and rearward spars 31, 32 it is possible to straightforwardly mount the wing assembly mount 40 to the structural parts of the wing assembly 30. The provision of a single spigot aids to restrict the carrying of wing bending loads into the fuselage. However, in an alternative arrangement two or more spigots may be used.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. An aircraft comprising:
   a wing assembly;
   a fuselage assembly above the wing assembly,
   a wing assembly mount between the wing assembly and the fuselage assemble, the wing assembly mount including:
      a spigot arrangement configured to react a load between the wing assembly and the fuselage assembly, wherein the spigot arrangement includes:
         a spigot mounted to one of the wing assembly mount and the fuselage assembly, wherein the spigot is oriented along a z-direction of the aircraft, and
         a spigot bush mounted to the other of the wing assembly mount and the fuselage assembly, wherein the spigot bush forms a sleeve oriented along the z-direction and configured to receive the spigot to allow the spigot to slide vertically within the sleeve.

2. The aircraft of claim 1, wherein the spigot arrangement is configured to react loads acting in an plane defined by a x-direction and a y-direction of the aircraft, wherein the x-direction and the y-direction are both perpendicular to the z-direction, and wherein the spigot arrangement does not react to loads along the z-direction.

3. The aircraft of claim 1, wherein the spigot is the only spigot on the wing assembly mount and on the fuselage assembly.

4. The aircraft of claim 3, comprising a side load connection configured to react a load acting about the spigot arrangement.

5. The aircraft of claim 1, wherein the spigot arrangement is offset from a centerline of the wing assembly.

6. The aircraft of claim 1, wherein the wing assembly is a tip-to-tip wing assembly.

7. The aircraft of claim 1, further comprising a connector arrangement configured to connect between the wing assembly and the fuselage assembly.

8. The aircraft of claim 7, wherein the connector arrangement is configured to carry a load in the z-direction of the aircraft.

9. The aircraft of claim 7, wherein the connector arrangement is configured to permit rotation about an axis extending in an x-direction of the aircraft.

10. The aircraft of claim 7, wherein the connector arrangement comprises a plurality of shackle connections.

11. The aircraft of claim 10, in which two of the shackle connections are disposed on one side of a centerline of the wing assembly, and wherein the spigot arrangement is disposed between the two of the shackle connections.

12. The aircraft of claim 10, wherein at least two of the shackle connections are configured to mount to a forward spar of the wing assembly, and at least two additional ones of the shackle connections are configured to mount to a rearward spar of the wing assembly.

13. The aircraft of claim 1, wherein the connector arrangement is configured to provide a hanging connection to carry the load of the wing assembly in the z-direction on the fuselage assembly.

14. The aircraft of claim 1, wherein the spigot arrangement is configured to connect to a frame of the fuselage assembly.

* * * * *